UNITED STATES PATENT OFFICE.

JINNOSUKE TSUZUKI, OF OGIKUBO, NEAR TOKYO, JAPAN.

PROCESS OF PREPARING AN ANTIBERIBERIC.

1,058,927.      Specification of Letters Patent.      Patented Apr. 15, 1913.

No Drawing.      Application filed January 13, 1912. Serial No. 671,119.

*To all whom it may concern:*

Be it known that I, JINNOSUKE TSUZUKI, a subject of the Emperor of Japan, residing at Ogikubo, near Tokyo, Japan, have invented certain new and useful Improvements in Processes of Preparing an Antiberiberic, of which the following is a specification.

This invention consists in the production of an antiberiberic preparation efficacious for the treatment of beriberi from rice-bran by extracting the rice-bran with alcohol to form an alcohol extract, evaporating or concentrating this extract at a low temperature, dissolving the concentrated extract in water, separating impurities by treatment with ammonium sulfate, and separating the desired extracted material from the purified aqueous solution by alcohol to form an alcohol solution of the purified product, from which a concentrated product can be obtained by evaporation at a low temperature of the alcohol extract, and by separation of the ammonium sulfate contained in the solution.

The process of producing this product is more fully described by the following description, which is to be considered as illustrating rather than as limiting it. To 1000 g. of rice-bran 2000 g. of alcohol of about 60% strength are added and the mixture is allowed to stand for about twelve hours with occasional stirring at a temperature of 10 to 20° C. It is then filtered and pressed, a cloth filter being suitable for this purpose. The filtrate and liquor resulting from pressing may be filtered again, if necessary, and amount to about 1500 g. of a transparent yellow liquid. This liquid is the alcohol extract of the rice-bran and forms the raw material of the present process.

The extract is evaporated at the temperature of 60 to 80° C., and a brownish thick syrupy liquid (about 200 grams) is obtained. This is dissolved in 2000 grams of ordinary water, then ammonium sulfate is slowly put in while stirring. The sulfate dissolves, and when the liquid is saturated with the sulfate it will be precipitated at the bottom of the vessel. As soon as this is noticed the adding of the sulfate is stopped. Though it is not easy to accurately determine the quantity of the sulfate required, it may be stated that more than 50 grams are usually added to 2000 of the liquid.

When the liquid is saturated with the sulfate the albumin contained in the liquid is separate and comes to the surface. The floating albumin is removed, but more or less may be left without affecting the efficiency of the product.

To the liquid saturated with the sulfate 300 to 400 grams of 60 to 80% alcohol are added. The alcohol makes a separate layer on the surface and does not mix with the liquid, this phenomenon being due to the fact that the absorbing power of the sulfate and water is greater than that of alcohol and water. The alcohol forming the upper layer always absorbs a certain definite quantity of water and the ammonium sulfate contained in it, and this whether the alcohol used is of 60 or 90% purity. While the watery and alcohol layers are in contact with each other the soluble matters are transmitted from the watery layers to the alcohol layer, with the result that the latter gradually becomes tinged in color. The two layers are left in contact for about an hour and then with a funnel the alcohol layer is separated. The beriberi specific being soluble in alcohol is held in the separated layer.

The alcohol is freed by filtering from insoluble albuminous matters and other foreign ingredients which are found more or less in it, and a transparent reddish brown liquid is obtained. When subjected to evaporation at a temperature of 60 to 80° C., the liquid gradually becomes thickened and the sulfate contained forms a thin coating on the surface and becomes separated. Then the evaporation is stopped, and 300 grams of dehydrated alcohol are poured on and the mixture is stirred. The sulfate insoluble in dehydrated alcohol is almost entirely separated and only the substances soluble in dehydrated alcohol remains in it. The beriberi specific being soluble is held in this dehydrated alcohol. When filtered, a transparent reddish brown liquid is obtained, and this is subjected to evaporation at the temperature of 60° to 80° C., resulting in brownish thick juice weighing about 50 grams. This is called the antiberiberic extract and contains in constant state a large proportion of pure antiberiberic which is highly efficacious in the treatment of beriberi.

The specific ingredient of rice-bran which is thus obtained in the form of an extract has been found efficacious for treating beriberi, its use and action being in many respects similar to those of diphtheria antitoxin in the treatment of diphtheria.

The extract above referred to has an acid reaction and is hygroscopic, so that it does not readily harden unless left in a thin layer in a desiccator for a considerable period of time. It can be administered hypodermically in dilute solution.

In the production of this product it has been found that alkalis and acids should be avoided, as well as high temperatures. Usually a temperature below 80° C. is desirable.

I claim:

1. The process of preparing a product from rice-bran suitable for the treatment of beriberi which comprises extracting rice-bran with alcohol, concentrating the alcohol extract, purifying the concentrated extract by treatment with ammonium sulfate in aqueous solution, extracting the purified aqueous solution with alcohol, concentrating, extracting the concentrated material with absolute alcohol and then condensing the extract at a low temperature.

2. In the production of a product from rice-bran suitable for the treatment of beriberi the step which comprises purifying an aqueous solution of alcohol-soluble extractive matter by treatment with ammonium sulfate.

3. In the production of a product from rice-bran suitable for the treatment of beriberi the step which comprises separating the purified product from admixed ammonium sulfate by extraction with absolute alcohol.

4. The process of preparing a product from rice-bran suitable for the treatment of beriberi which comprises extracting rice-bran with an alcoholic organic solvent, and purifying the extracted material from accompanying albuminous impurities.

In testimony whereof I affix my signature in presence of two witnesses.

JINNOSUKE TSUZUKI.

Witnesses:
J. K. CALDWELL,
M. NAMBU.